United States Patent [19]

Hysen et al.

[11] 4,182,405
[45] Jan. 8, 1980

[54] FOOD HOLDER TEMPERATURE MAINTENANCE SYSTEM

[76] Inventors: P. Paul Hysen, 14500 Fairmont, Detroit, Mich. 48205; James J. Souder, 630 Archwood; Lindsay E. Waldorf, 3888 Lock Alpine Dr., both of Ann Arbor, Mich. 48103

[21] Appl. No.: 712,819

[22] Filed: Aug. 9, 1976

[51] Int. Cl.$^2$ .............................................. F25B 29/00
[52] U.S. Cl. ............................... 165/48; 62/430; 62/457; 126/246; 126/400; 165/DIG. 4
[58] Field of Search ....................... 126/246, 261, 400; 62/430, 457, 432; 165/DIG. 4, 48, 104 S, 58

[56] References Cited

U.S. PATENT DOCUMENTS

| | | | |
|---|---|---|---|
| 187,511 | 2/1877 | Clark | 126/246 |
| 189,412 | 4/1877 | Wright | 126/246 |
| 230,199 | 7/1880 | Sawyer | 126/246 |
| 907,099 | 12/1908 | Trowbridge | 165/DIG. 4 |
| 3,019,783 | 2/1962 | Clark | 126/246 |
| 3,148,676 | 9/1964 | Truog et al. | 126/246 |
| 3,286,483 | 11/1966 | Burg | 62/457 |
| 3,429,369 | 2/1969 | Segal | 126/261 |
| 3,952,794 | 4/1976 | Spanoudis | 165/58 |

FOREIGN PATENT DOCUMENTS

| | | | |
|---|---|---|---|
| 85702 | 9/1920 | Switzerland | 126/246 |
| 1426505 | 3/1976 | United Kingdom | 126/246 |

Primary Examiner—Albert W. Davis, Jr.
Assistant Examiner—Margaret A. Focarino
Attorney, Agent, or Firm—Krass & Young

[57] ABSTRACT

A food holder arrangement is disclosed for use in delivering meals including both hot and cold food items to points of consumption remote from the point of preparation with the hot and cold food temperatures maintained. The food holder arrangement includes a flat tray having a heat retaining insert extending over a portion of the area of the tray. A pair of covers are also provided, one extending over the area occupied by the heat retaining insert, the other extending over a remaining area of the tray, with this other cover having in its top a heat absorbing insert. This location of the respective inserts is such that upon preheating and prechilling of the inserts, convection currents result within the respective covers which are augmented by conductive and radiation heat transfer effects so as to maintain the hot and cold food temperatures. These inserts are disclosed as either materials having a high heat capacity or substances which have an appropriate phase change at the approximate food temperatures which are to be maintained.

Also disclosed is an improved insert arrangement for maintaining the hot foods at relatively level, moderately hot temperatures, the insert including a non-toxic substance which undergoes a change of state at temperatures on the order of 125°–200° F. so that the heat released in undergoing such change of state may be utilized to maintain the food temperatures. Examples of such substances are given as waxy organic crystalline substances such as paraffin, stearic acid, and palmitic acid or mixtures of the same.

10 Claims, 7 Drawing Figures

FOOD HOLDER TEMPERATURE MAINTENANCE SYSTEM

BACKGROUND OF THE INVENTION

1. Field of the Invention

This invention concerns food holders and more particularly food holders adapted to maintain temperatures of meals including both hot and cold foods at the proper serving temperatures.

2. Description of the Prior Art

The serving of food at locations remote from the point of preparation must meet certain requirements, particularly in the serving of meals in volume. These requirements include the need for maintaining the food temperatures at proper levels, i.e. the entrees, soups, hot beverages, etc., hot and the salads, desserts, cold beverages, etc, cold, in order to preserve the wholesomeness and palatability of the food involved. The food must also be completely enclosed during transport from the preparation site to the serving site for similar health and sanitation as well as aesthetic considerations. These requirements should be fulfilled without involving excessive expenditures of labor or heavy investment in equipment, etc. to keep costs within reason for such cost sensitive institutions as hospitals or commercial enterprises such as hotels.

The presentation of the food should also be in such a mode as to be aesthetically pleasing without the imposition of any annoying or distracting constraint in its comsumption. The food for convalescent or elderly pateints in hospitals or nursing institutions should be readily accessible since such persons may encounter difficulties or have limited capacity for movements in eating of the meal.

All of these requirements have not heretofore been provided by the approaches developed to date, as will be described below.

One traditional approach has been to prepare the food in bulk in a central kitchen and deliver bulk quantities of such food to remote satellite pantries or small kitchens. At these locations the food is kept in temperature maintaining enclosures for serving at relatively nearby locations. While achieving the objective of serving appropriately hot and cold foods, many of the advantages of central preparation are thereby lost, i.e. there is an aggregative increase in wastage involved in numerous satellite locations, greater difficulties in forecasting due to inability to forecast exact requirements at each location, and also there are increases in requirements of equipment, labor and supervision due to losses in efficiency. Finally, the length of time from initial food preparation to consumption is increased by the increased number of handling operations leading to some deterioration in palatability and nutritional value.

Accordingly, the disadvantages of such decentralized kitchen facilities has created a widespread trend towards total centralization. The temperature maintenance associated with such central preparation has been attempted to be solved by various measures.

One of these involves the use of a relatively heavy slug disposed within the food container which when preheated would tend to maintain the temperature of the hot foods. While this approach is partially successful in providing maintenance of hot food temperatures, the initial temperatures to which the relatively low heat capacity slug must be heated are quite high, leading to difficulties in handling, and the temperatures drop relatively rapidly, subjecting the food to deleterious temperature swings. Furthermore, this arrangement makes no provision for maintenance of the temperature of the cold or chilled foods.

Another approach has involved the use of heated and refrigerated carts in which the hot and cold food products were segregated within the cart and the meals assembled at the consumption site. This need for assembling the meal renders the meal serving process more labor intensive and also increases the incidence of improper assemblage of meals due to errors by personnel assigned this task. A refinement of this approach has involved the attempt to segregate such hot and cold food products on a tray which physically straddles a partition located within the cart and divides the hot and cold regions. Use of such equipment has numerous disadvantages, however, i.e. they are rather bulky, heavy, difficult to move, expensive to purchase and maintain, require considerable labor to properly clean and contain numerous nooks and crannies within which insects and other vermin could be harbored.

Another approach has included the utilization of an insulated tray with a bottom molded tray and an upper cover unit that covers most of the bottom tray component. Most typically the top and bottom components consist of a series of cavities aligned one above the other so that when the cover is placed over the bottom tray unit totally encapsulated compartments are formed each specifically designated for the accommodation of a specific food product, depending on the insulating properties of the tray in order to maintain the food temperatures. These units perform reasonably well, particularly when stacked since the configuration of the trays is such that the respective hot and cold food products are segregated vertically together so as to minimize heat transfer between the hot and cold regions. However, the length of time that these food portions can be held at temperature is limited and also require special items of dishware especially designed for the tray configuration, and also impose size constraints on the selection of the portions served. Finally, the configuration of the trays is such that the location of the dishware is constrained such that dishes or other containers are not easily rearranged as the various courses are consumed which can be an annoyance to a fully mobile consumer, and can even impose a hardship on convalescents or geratric patients with limited mobility.

It is therefore an object of the present invention to provide an arrangement for holding food while it is in transport from a preparation location to a point of consumption, which holder arrangement will maintain both hot and cold food items at their appropriate temperatures for extended periods of time.

It is a further object of the present invention to provide this result without the need for complicated and expensive equipment.

It is a further object to provide such a result which does not require any handling of the food in serving other than simple distribution of assembled trays at the serving point.

It is yet another object of the present invention to provide such an arrangement that does not require the use of specially designed dishware and which allows the person consuming the meal to easily and freely rearrange placement of dishware in the course of the meal.

Another object of the present invention is to provide a heat retaining means which maintains the hot food items at relatively moderate, even temperature levels over an extended period of time.

SUMMARY OF THE INVENTION

These and other objects which will become apparent upon reading of the following specification and claims is accomplished by a food holder arrangement comprised of a flat tray which contains a heat retaining insert extending over a portion of the area of the tray and a pair of covers the first of which is disposed to enclose the region defined by the heat retaining insert, and the second cover enclosing a portion of the remaining area of the tray, this second cover containing a hear absorbing insert in its top. The resulting vertical offset of the respective hot and cold inserts provides maximum separation therebetween, with this location of the inserts also maximizing thermal transfer from each of the inserts to the food enclosed within the cover by virtue of resulting convection currents set up within the respective covers augmented by other modes of heat transfer. These inserts are disclosed as either masses which have relatively high heat capacities or which consist of substances which have a phase change at approximately the temperature to be maintained, so as to utilize the heat of transformation of the respective materials in achieving temperature maintenance.

An improved heat retaining insert is also provided which is comprised of a substance, such as stearic acid, paraffin, or palmitic acid, which undergoes a molecular change of state at temperatures on the order of 125°–200° F. such that heat is released in undergoing such change of state which may be utilized in maintaining the hot food temperatures.

DETAILED DESCRIPTION

In the following specification and claims , certain specific terminology will be utilized and particular embodiments described in accordance with the requirements of 35 USC 112. It is to be understood that the invention may be practiced in a wide variety of forms and the aforementioned terminology and specific embodiment described should not be construed in a limiting sense.

Figure 1:
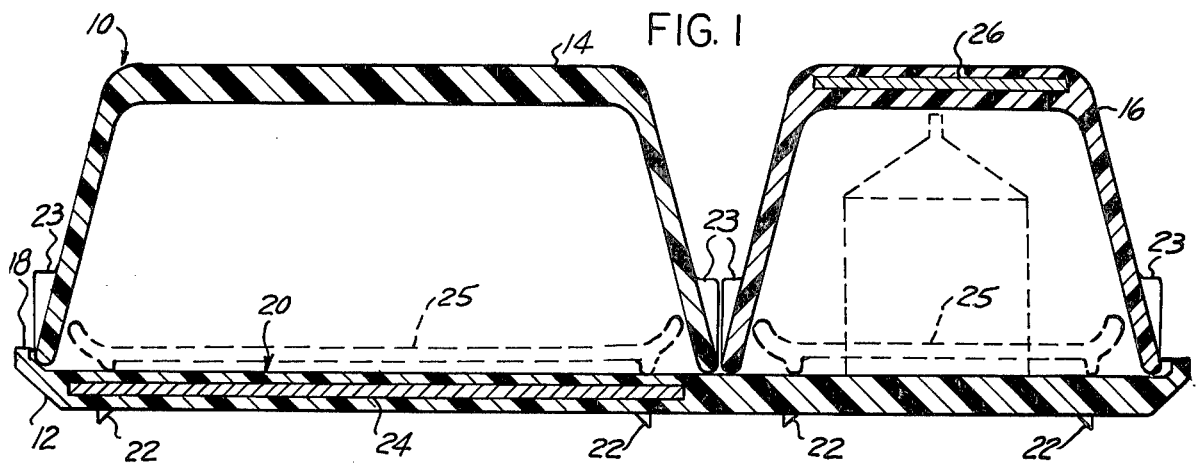
FIG. 1 is a sectional view of a holder arrangement according to the present invention.
Figure 2:
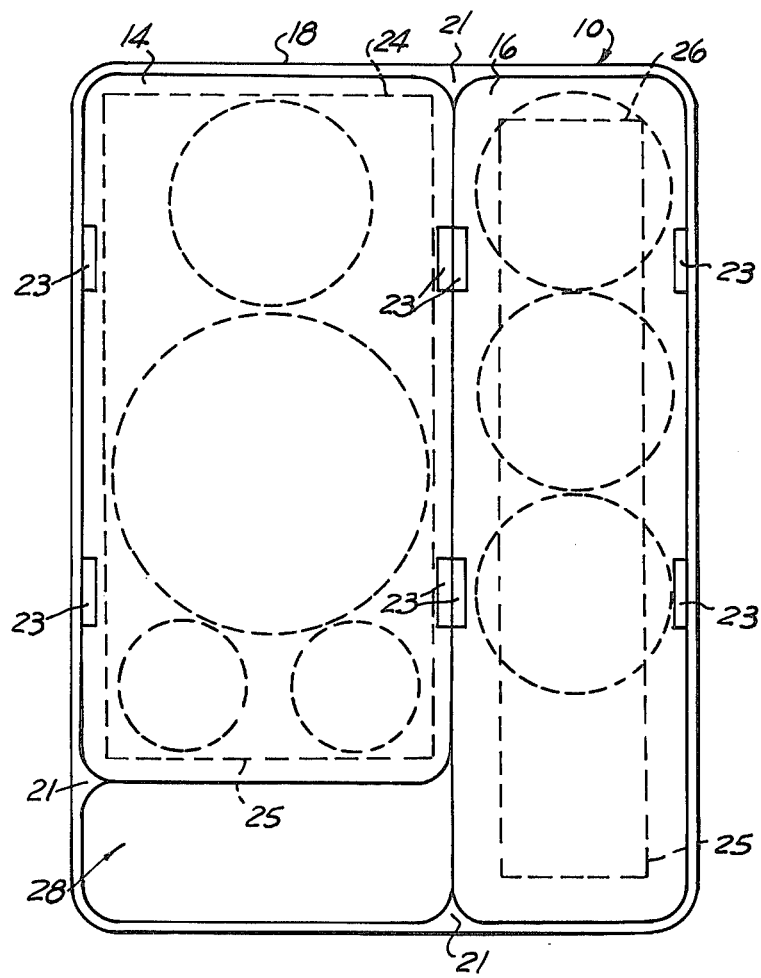
FIG. 2 is a plan view of a holder arrangement according to the present invention.

Referring to the drawings, and particularly FIGS. 1 and 2, a holder arrangement according to the present invention is shown which comprises a tray and cover assembly 10, including a tray member 12 and a first and second covers 14 and 16, respectively. The tray 12 is of more or less conventional exterior configuration, including a lip 18 extending about the periphery thereof and the bottom of which providing a planar food receiving surface 20 upon which various dishware may be placed. Positioning lugs 22 may be provided integral therewith for purposes of stabilizing stacked cover and tray assemblies, 10, while positioning lugs 21 position the covers 14 and 16 on the tray. Spacer lugs 23 may also be provided on the covers 14 and 16 to allow air circulation when the covers themselves are stacked. Tray 12 may be fabricated by means of a molding or other suitable process of a plastic or other material having suitable insulating properties, such as polyurethane with foamed skin.

According to the teaching of the present invention, the tray 12 carries within its thickness a heat retaining insert 24, which extends over a portion of the planar region defined by the tray surface 20. This insert is preferably integrally molded but alternatively may be separable and retained by clips or other fasteners or adapted to be slid into an appropriate recess. This heat retaining insert 24 may be a metal slug which has been molded within the bottom thickness of the tray 12 as shown in FIG. 1.

The first cover 14 may be similarly formed of insulating plastic, and adapted to rest on the surface 20 of the tray 12 roughly coextensively with the region defined by the heat retaining insert 24, this combination of the cover 14 and this region of the tray surface 20 forming a heat retaining enclosure adapted to receive dishware 25 containing the food items which are to be retained at relatively elevated temperatures such as the soup, entree, and hot beverage items.

A portion of the remaining region of the surface of the tray 12 is enclosed by means of the second cover 16 which would in similar fashion to the first cover 14 be of plastic having suitable insulating properties. The cover 16 has molded therein a heat absorbing insert 26 in its top as shown in FIG. 1. This heat absorbing insert 26 would be a material having a characteristically high heat capacity such that when chilled would absorb a relatively great quantity of heat before reaching ambient temperatures so as to provide a heat sink. Taken together, the second cover 16 and the region of the tray surface 20 contacted by the lower periphery of the second cover 16 would comprise a cold retaining enclosure.

The remaining portion of the tray 28 could be reserved for items such as silverware and napkins, etc, which need not be maintained at any particular temperature and need not be covered in transit.

It can be seen in referring to FIG. 1 that this combination will be very effective in attaining the objectives of the invention inasmuch as the relative placement of the heat retaining insert 24 and the heat absorbing insert 26 is optimal in achieving temperature maintenance within the respective enclosures. That is, the convection currents created by heating and cooling of the air within the respective enclosures tends to produce good heat transfer between the respective inserts and the food items contained within the enclosure. That is, the slightly warmed air tends to rise from the surface of the tray 20 and circulate to the upper regions thereof to provide a means for transferring the heat retained in the insert 24 to the remainder of the enclosure. Similarly, the air beneath the cover 16 tends to be chilled immediately below the region of the insert causing it to tend to settle to lower regions of the enclosure providing a heat transfer mechanism from the insert 26 to the food items enclosed therein. Heat transfer also occurs by radiation and conduction. Additionally maximum physical separation of the inserts 24 and 26 minimizes cross-transference of heat between the hot and cold regions since the temperature differentials between contiguous regions is thereby reduced.

Figure 3:
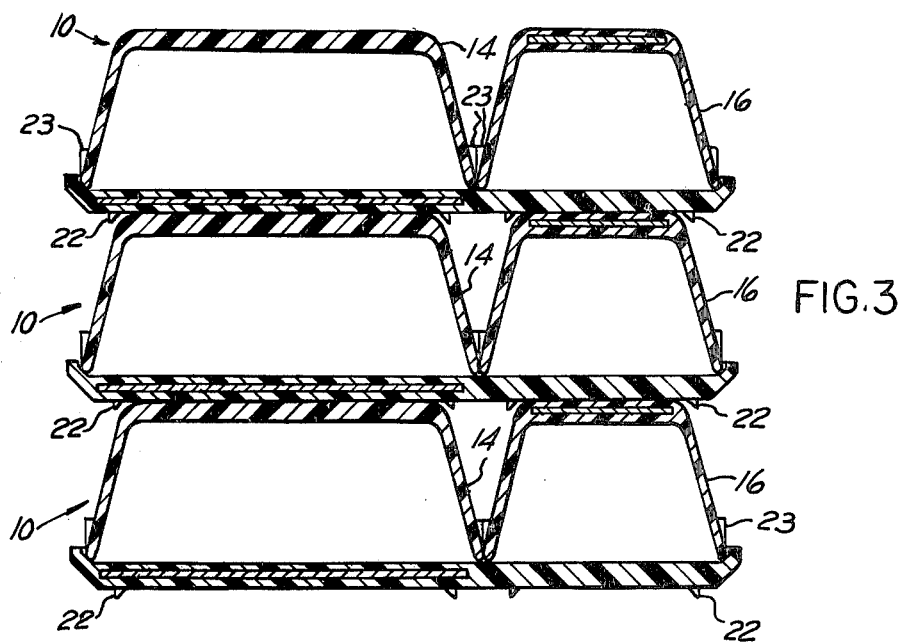
FIG. 3 is a sectional view of a plurality of holders stacked together.

Referring to FIG. 3 the cover and tray assemblies 10 are easily stacked as shown with the lugs 22 mating with the respective covers 14 and 16 of the lower tray and cover assemblies. It can also be seen that no special racks will be necessary for this purpose and conventional carts can be used in transporting the assemblies to the consumption points.

It can also be seen in reference to FIG. 3 that an additional advantage is obtained by this combination, i.e., the resulting stack vertically aligns all the hot and cold portions of the trays, and taken with the convection current characteristic of the respective enclosures, heat transfer tends to be enhanced in the vertical direction. This maximizes the mutual heat transfer between each of the contiguous hot regions and each of the contiguous cold regions to thereby enhance the temperature maintaining effects of the food holder.

Figure 4:
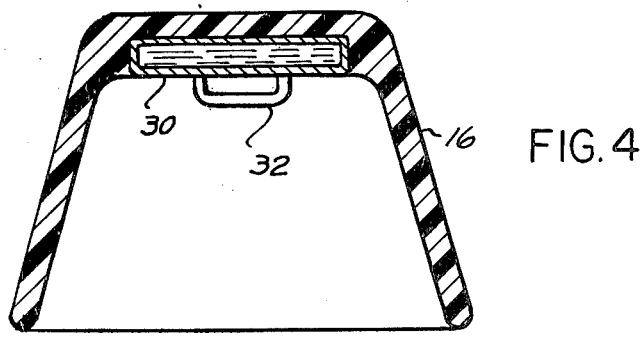
FIG. 4 is a sectional view of an alternate embodiment of the cold food cover included in the holder arrangements depicted in FIGS. 1 and 2.

The respective inserts may take many forms, as for example in FIG. 4, the heat absorbing insert 26 may be removable by means of being press fitted into the insert surface of the cover 16 and may take the form of a hollow container 30 having an appendage 32 in order to enable easy removal and replacement thereof. This hollow container would carry a liquid such as water, or some other suitable substance which has a freezing point at an appropriately low temperature in order to provide the cooling effect desired. This would allow the heat of transformation (here, that of fusion) to be utilized as a cold storage reservoir. As is well known, the heat absorbed in thawing a frozen substance, particularly water is relatively great compared to the quantity of heat required to simply raise the temperature of a solid or liquid a degree and accordingly provides an effective heat absorbing reservoir.

This removability feature would allow the relatively efficient refrigeration of the inserts only so that a great deal of freezer space would not be required in order to chill the insert in comparison with the alternative of refrigerating the complete cover.

Figure 5:
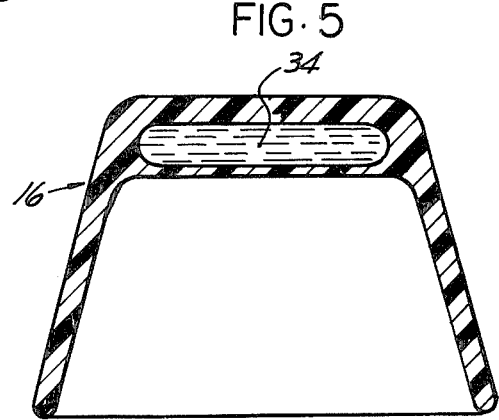
FIG. 5 is a sectional view of another embodiment of the cold food cover included in the food holder arrangement depicted in FIGS. 1 and 2.
Figure 7:
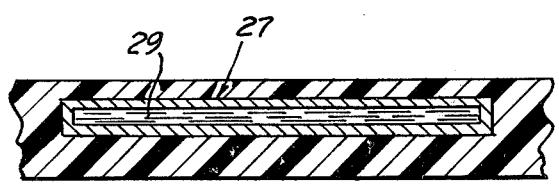
FIG. 7 depicts in section an alternative embodiment of the heat retaining insert.

A second alternative in FIG. 5 would involve the use of the cavity 34 molded within the top of the cover 16 with the liquid such as water merely injected within the cavity 34 to provide a totally enclosed design.

Figure 6:
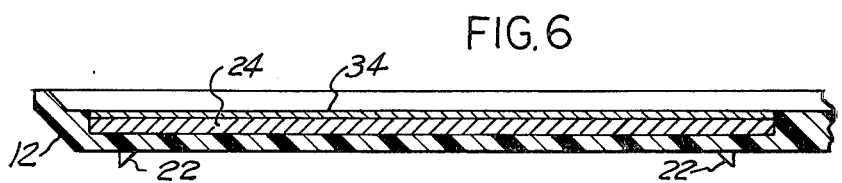
FIG. 6 is a fragmentary view in section of a portion of the tray shown in FIGS. 1 and 2 depicting an alternate mode of assembling the heat retaining insert therein.

Referring to FIG. 6, the heat retaining slug may also be inserted after application of the heat by means of a press fitting of the insert 24 into a recess in the upper surface or alternatively a side pocket (not shown) of the tray 20. A decorative and protective cover 34 may be affixed to the upper surface of the insert 24 in this instance.

According to another aspect of the present invention, an effective arrangement is here provided to allow the utilization of a heat released in the change of state of a substance in the heat retaining insert which heretofore has only been attained in the maintenance of cold food temepratures.

In this case, the heat retaining insert 24 is provided, in a similar fashion to that depicted in FIGS. 4 and 5 for the heat absorbing insert 26, by an enclosure 26 containing a quantity of a non-toxic substance 29 which freezes at an elevated temperature (or temperature range) suitable for maintaining the temperature under the cover 14 warm, i.e. 125°-200° F. It has been discovered that a class of waxy crystalline substances are peculiarly well adapted to this end, such as stearic acid ($C_{18}H_{37}O_2$) which melts at 154° F. and absorbs relatively large quantities of heat in being heated at this temperature so that the heat involved in changing phases, i.e. the heat of transformation may also be taken advantage of in this application as the material cools sufficiently to refreeze. Other such waxy crystalline substances are palmitic acid ($C_{16}H_2O_2$) which has a melting point of 145° F. and paraffin are also desirable as non-toxic heat retaining materials. It may also be advantageous to provide mixtures of these substances to produce a characteristic freezing point for which the equipment is particularly designed or for which the particular application is well suited, since mixture of the substances will produce various freezing points.

Thus, it can be seen that this approach allows the temperature of the insert to be kept at reasonably low and constant levels at which relatively safe and convenient handling can take place as well as being less deleterious to the food quality.

The heating of the insert 24 could advantageously be carried out by an inductive heating process, in which case the enclosure 27 containing the phase change substance or an insert in proximity thereto would be formed of a conductive substance which upon being inductively heated would in turn heat the substance contained therein.

It can therefore be seen that the objectives of the present invention have been met by this approach inasmuch as the food may be prepared at the central location and assembled onto the trays at the central location for distribution to the points of consumption without the need for extensive equipment or staffing at the remote locations. In addition, this arrangement provides for maintenance of the food items at their appropriate temperatures for extended periods of time. The tray configuration does not inhibit in any way the configuration of the dinnerware or the food items and allows the consumer to freely move the dishware about the tray surface. Finally, while the hot food temperatures may be maintained for extended periods, the need for heating the heat retaining insert to relatively excessively high temperatures is not required and the food items will be kept at moderate, stable temperatures for extended periods. It can also be appreciated that the trays and covers are relatively simple and accordingly inexpensive and are capable of being stacked, washed, stored, etc. with a minimum of space or effort and are therefore well suited to large volume applications such as institutions and commercial establishments.

Also by omitting the heating or prechilling of one or other of the inserts, food items may be served at ambient temperatures.

In connection with the removable insert embodiments, this would allow the first and second covers to be physically connected or integrally formed, since the entire covers would not have to be prechilled.

Finally, each of the respective inserts could alternatively be placed in one of the tray region or the respective cover i.e. both in the covers or both in the tray in order to define the hot and cold enclosures although special advantages accrue from the specific placement as described above.

The embodiments of the invention in which an exclusive property or privilege is claimed are defined as follows:

1. A food holder arrangement comprising:
   a tray having an upper, substantially planar surface;
   first cover means adapted to be disposed on said tray so as to overlie a first region of the upper surface of the tray to define, along with said first region, a hot food enclosure;
   a heat retaining insert carried by said tray in the first region of said surface of said tray or by said first cover means, adapted to release heat into said hot food enclosure;
   second cover means adapted to be disposed on said tray so as to overlie a second region of the upper surface of said tray to define, along with said first region, a cold food enclosure; and
   a heat absorbing insert carried by said tray in the second region of said surface of said tray or by said second cover means to absorb heat from said cold food enclosure, whereby said respective enclosures may be maintained at their respective hot and cold temperatures respectively by preheating and prechilling said inserts.

2. The food holder arrangement according to claim 1 wherein said heat retaining insert is carried in said tray in the first region of the surface of said tray and said heat absorbing insert is carried by said second cover means.

3. The holder arrangement according to claim 1 wherein said heat retaining and heat absorbing inserts comprise substances having melting points at relatively high and low temperatures respectively whereby the heats of transformation of said substances may be utilized in maintaining the respective regions at high and low temperatures respectively.

4. The holder arrangement according to claim 1 wherein at least one of said inserts are removable from said tray or said cover means respectively.

5. The holder arrangement according to claim 1 wherein said heat absorbing insert is located in the top of said second cover means.

6. The holder arrangement according to claim 1 wherein said heat retaining insert includes a quantity of a substance which freezes at a temperature corresponding to hot foods whereby the heat of transformation may be utilized in maintaining said hot temperatures.

7. The holder arrangement according to claim 1 wherein said heat retaining insert includes a quantity of a substance selected from the group of stearic acid, paraffin, or palmitic acid.

8. The holder arrangement according to claim 1 wherein said heat absorbing insert includes a quantity of a substance which melts at a low temperature corresponding to said cold temperatures whereby said heat of transformation of said substance may be utilized in maintaining said lower temperatures.

9. The holder arrangement according to claim 1 wherein said heat retaining insert includes a quantity of a substance which freezes at a temperature corresponding to hot foods whereby the heat of transformation may be utilized in maintaining said hot temperatures.

10. The holder arrangement according to claim 1 wherein said heat retaining insert includes a quantity of a substance selected from the group of stearic acid, paraffin, or palmitic acid.

* * * * *